United States Patent
Baker

(10) Patent No.: US 8,233,086 B2
(45) Date of Patent: Jul. 31, 2012

(54) PROCESS FOR DIGITIZING VIDEO OVER ANALOG COMPONENT VIDEO CABLES

(75) Inventor: Jacob Mateo Baker, Rohnert Park, CA (US)

(73) Assignee: Nintendo Co., Ltd., Kyoto (JP)

( * ) Notice: Subject to any disclaimer, the term of this patent is extended or adjusted under 35 U.S.C. 154(b) by 1109 days.

(21) Appl. No.: 11/923,802

(22) Filed: Oct. 25, 2007

(65) Prior Publication Data
US 2008/0303940 A1  Dec. 11, 2008

Related U.S. Application Data

(60) Provisional application No. 60/942,671, filed on Jun. 8, 2007.

(51) Int. Cl.
| H04N 5/46 | (2006.01) |
| H04N 7/00 | (2011.01) |
| H04N 7/01 | (2006.01) |
| H04N 9/74 | (2006.01) |
| H04N 11/00 | (2006.01) |
| H04N 11/20 | (2006.01) |
| G09G 5/00 | (2006.01) |
| G09G 5/02 | (2006.01) |
| G06K 9/32 | (2006.01) |

(52) U.S. Cl. ........ 348/445; 348/443; 348/458; 348/459; 348/552; 348/556; 348/581; 348/582; 345/671; 345/698; 382/298; 382/299; 382/300

(58) Field of Classification Search ............... 348/445, 348/458, 459, 448, 552, 556, 581, 582; 345/671; 382/298–300
See application file for complete search history.

(56) References Cited

U.S. PATENT DOCUMENTS

| 5,353,405 | A | 10/1994 | Doi et al. |
| 5,473,382 | A | 12/1995 | Nohmi et al. |
| 6,222,589 | B1 | 4/2001 | Faroudja et al. |
| 6,370,198 | B1 * | 4/2002 | Washino .................. 375/240.26 |
| 6,380,978 | B1 | 4/2002 | Adams et al. |
| 6,392,712 | B1 | 5/2002 | Gryskiewicz et al. |
| 6,456,329 | B1 | 9/2002 | Tinker et al. |
| 6,459,454 | B1 | 10/2002 | Walters |
| 6,650,323 | B2 | 11/2003 | Naegle et al. |
| 6,658,056 | B1 | 12/2003 | Duruoz et al. |
| 6,825,857 | B2 | 11/2004 | Harasimiuk |
| 6,859,235 | B2 | 2/2005 | Walters |
| 6,894,726 | B2 | 5/2005 | Carlsgaard et al. |
| 6,970,206 | B1 | 11/2005 | Swan et al. |
| 6,972,801 | B1 | 12/2005 | Ding et al. |
| 7,064,790 | B1 | 6/2006 | Varma et al. |
| 7,075,581 | B1 | 7/2006 | Ozgen et al. |
| 7,084,923 | B2 | 8/2006 | Elliott et al. |
| 7,098,958 | B2 | 8/2006 | Wredenhagen et al. |
| 7,113,222 | B2 | 9/2006 | Kodama |
| 7,170,562 | B2 | 1/2007 | Yoo et al. |
| 7,190,450 | B2 | 3/2007 | Chang et al. |
| 7,196,731 | B2 | 3/2007 | Tsao et al. |
| 7,206,028 | B2 | 4/2007 | Yeh et al. |
| 7,215,376 | B2 | 5/2007 | Adams et al. |

(Continued)

Primary Examiner — Dominic D Saltarelli
(74) Attorney, Agent, or Firm — Nixon & Vanderhye P.C.

(57) ABSTRACT

A method for efficient digital capturing of analog video signals of computer game consoles is provided. The video format of the signal is changed from 480p to 720p, without any scaling artifacts. The number of active horizontal resolution lines and active vertical resolution lines is reduced in the higher definition space, so that the output picture is a pixel-for-pixel transformed replica of the 480p image.

25 Claims, 4 Drawing Sheets

U.S. PATENT DOCUMENTS

| | | |
|---|---|---|
| 7,242,436 B2 | 7/2007 | Tsao et al. |
| 7,256,835 B2 | 8/2007 | Jiang et al. |
| 7,271,841 B2 | 9/2007 | Swan et al. |
| 7,280,155 B2 | 10/2007 | Law et al. |
| 7,589,794 B2 * | 9/2009 | Adachi ..................... 348/555 |
| 2005/0062889 A1 * | 3/2005 | Linzer ..................... 348/554 |

* cited by examiner

- # glmode 4 1
- # iar 3 2
- # reso 75
- # ohatv 960
- # ovatv 486
- # ohpos 420
- # ovpos 143

FIG. 3

PROCESS FOR DIGITIZING VIDEO OVER ANALOG COMPONENT VIDEO CABLES

CROSS-REFERENCE TO RELATED APPLICATION

This application claims the benefit of priority from provisional application No. 60/942,671 filed Jun. 8, 2007, the contents of which are incorporated herein by reference.

FIELD

The technology herein relates to video signal processing, and more particularly, to efficiently digitizing the output video stream of computing devices, such as video game systems. Still more particularly, the technology herein relates to the transformation of the video picture from a lower definition format to a higher definition format, without introducing undue scaling artifacts into the conversion, while both the 60 frames per second rate and the progressive scanning nature of the frames can be maintained.

BACKGROUND AND SUMMARY

Due to the increasingly popular practice of playing computer video games over the Internet and other digital media, it would be advantageous to digitize the analog video output of the computer game console device before it is sent to its destination. The maximum resolution for the output signal of certain platforms, such as the Wii video game console manufactured and sold by Nintendo, is 720×486 pixels, running at 60 frames per second, progressive scan "extended definition" resolution (sometimes referred to as SMPTE293M, and referred herein as "480p60"), when transmitted over analog component video cables.

In interlaced scanning such as commonly used for television sets, a frame representing a picture is split into two separate fields. One field may include odd lines of the picture and the other field may include even lines of the picture. The two fields constitute a frame. A picture formed by interlaced scanning is drawn on the screen in two passes, first by scanning the horizontal lines in the first field, retracing to the top of the screen and then scanning (or interlacing) the horizontal lines in the second field in-between the first set of lines. Interlacing field 1 and field 2 at 60 fields per second yields an effective 30 frames per second frame rate.

In non-interlaced scanning, the picture is formed on the display by scanning all of the horizontal lines of the picture in one pass from the top to the bottom. This is sometimes also referred to as "progressive scanning". Unlike interlaced scanning, progressive scanning involves complete frames including both odd and even lines, in other words, each scan displays an entire frame. For example, in progressive scanning, a frame rate of 60 frames per second causes 60 frames to be formed on the display, in contrast to interlaced scanning, where a field rate of 60 fields per second causes only 30 frames per second to form on the display. This is at least one reason why the progressive mode provides better quality pictures than the interlaced mode.

Currently, it would be desirable to digitally capture an analog 480p60 video signal, while maintaining the refreshing rate of 60 frames per second, as well as the progressive nature of scanning of the frames. Furthermore, the capture process in the past often involves the resizing of the 480p60 video picture into a 720p60 video picture. In other words, the resolution of the picture changes from 720×486 pixels, 60 frames per second, progressive scanning, to 1280×720 pixels, 60 frames per second, progressive scanning (referred herein as 720p60 or 720p space/frame). However, existing video scaler systems that convert 480p60 video to 720p60 video rescale the picture so that the resized picture is forced to fill the whole higher-resolution 720p frame. This results in scaling artifacts, because of the non-integer ratio between 480p resolution and 720p resolution, and the size mismatch between the 0.9 (CCIR 601) NTSC lower definition pixel and the 1.0 square HDTV pixel.

One exemplary illustrative non-limiting method and apparatus for efficient digital capture of an analog video signal output of a computer game console, while maintaining its 60 frames per second rate and the progressive scanning mode of the video includes the resizing of the 480p60 video picture into a pixel-for-pixel translated replica inside the 720p60 space. A video scaler device is used to convert the 720×486p video signal of the Wii output into a 1280×720 @ 59.94p signal. By reducing the number of active lines of horizontal resolution and active lines of vertical resolution inside the higher definition 1280×720 space, the output picture is made to reflect the same number of pixels as the original 480p60 image, thus avoiding any scaling artifacts that are normally produced by the scaling process.

BRIEF DESCRIPTION OF THE DRAWINGS

These and other features and advantages will be better and more completely understood by referring to the following detailed description of exemplary non-limiting illustrative implementations in conjunction with the drawings of which:

FIG. 3 is a chart of exemplary illustrative non-limiting video scaler capture settings used in an exemplary illustrative non-limiting implementation.

DETAILED DESCRIPTION

Figure 1:
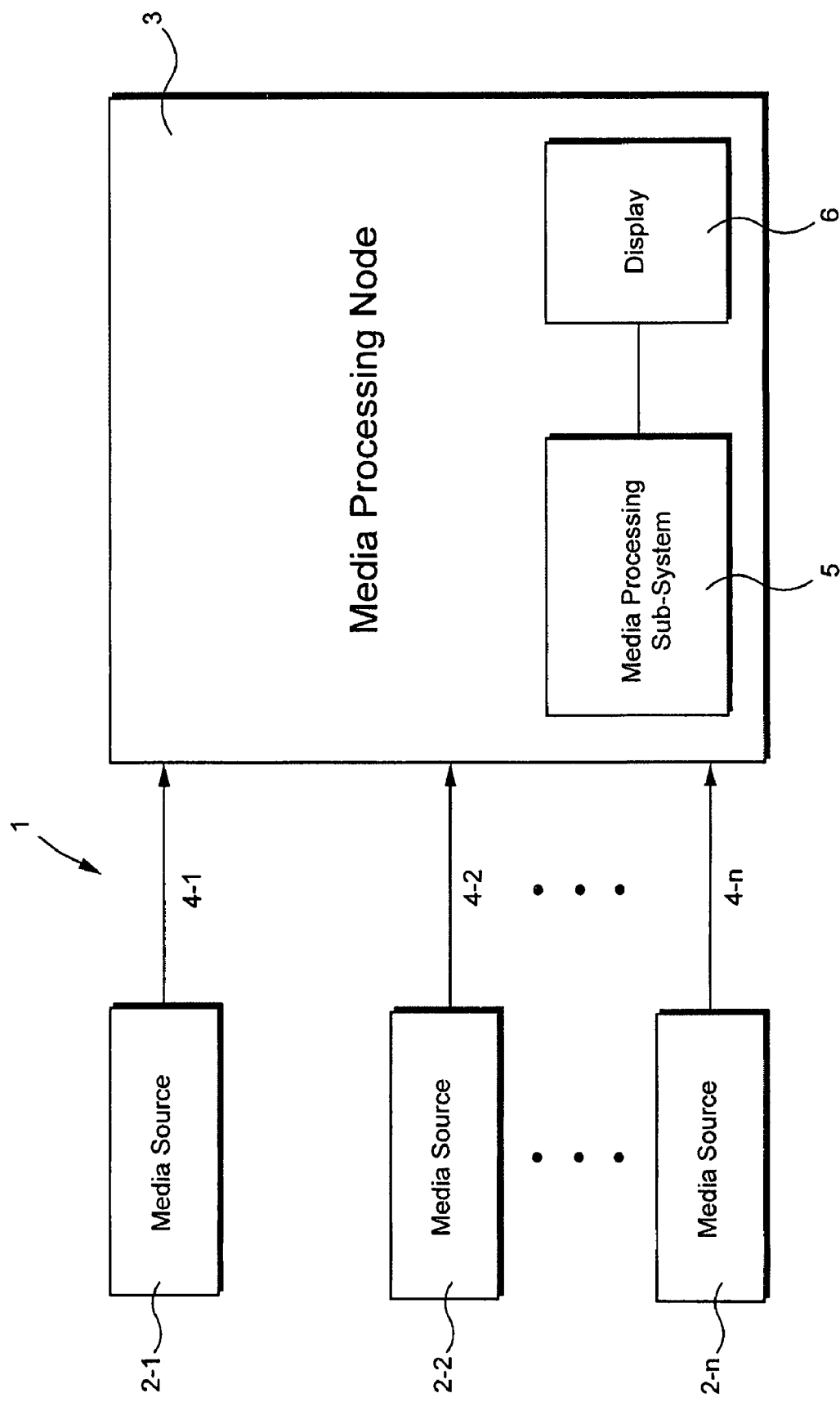
FIG. 1 is a block diagram of a typical media processing system.

An example of a media processing system 1 having one or more media source nodes 2-n connected to a media processing node 3 by one or more communications media 4-n is shown in FIG. 1. Media source nodes 2-n may comprise any media source capable of creating and/or delivering media information and/or control information to the media processing node 3. More particularly, media source nodes 2-n may comprise any media source capable of creating and/or delivering digital video and/or audio signals to media processing node 3. For example, media source nodes 2-n may be any hardware or software element capable of creating and/or delivering media information, including a computer, a video game console, a Compact Disk (CD) player, a Digital Versatile Disk (DVD) device, a Video Home System (VHS) device, a computer memory, a digital camera, telephone system, and the like. Other examples of media source nodes 2-n may include media distribution systems that provide broadcasting of streaming analog or digital audio and video (AV) signals to media processing node 3. Examples may include Over The Air (OTA) broadcast systems, terrestrial cable systems (CATV), and satellite broadcast systems. The media source nodes may be external or internal to the media processing node depending on the application.

The different types of media information may generally include any data such as voice information, video information, audio information, image information, textual information, alphanumerical information, graphics and so forth. Control information refers to data representing commands, instructions for an automated system, for example, control information relevant for routing media information through a network, establishing a connection between devices, instructing a node to process the media information in a predetermined manner, and so forth.

The incoming video signals coming from the various media source nodes 2-n may have a distinguishing format, sometimes referred to as visual resolution format. Examples include a digital television (DTV) format, high definition television (HDTV) format, progressive format, computer display format, and so forth. Specifically, the information may be encoded with a vertical resolution format ranging between 480 visible lines per frame to 1080 visible lines per frame, and a horizontal resolution format ranging between 640 visible pixels per line to 1920 visible pixels per line. In one implementation, for example, the information may be encoded as a HDTV video signal having a visual resolution format of 720 progressive (720p), discussed further below, which refers to 1280 horizontal pixels and 720 vertical pixels (1280×720).

System 1 may be implemented as a wired communication system, a wirelesss communication system, or a combination of both. A typical example of wireless communication is communication over the Internet.

Media processing node 3 may comprise any node that is arranged to process media information received from media source nodes 2-n over communication media 4-n. Examples include a computer system, a computer subsystem, a computer, a workstation, a terminal, a server, a personal computer (PC), a laptop computer, a personal digital assistant (PDA), a mobile telephone, a microprocessor, a digital signal processor (DSP), and so forth.

In various implementations, the media processing node 3 may include a media processing sub-system 5 comprising a processor, memory, and hardware and/or software arranged to process media information received from media source nodes 2-n. Such sub-system may perform processing of the received information, such as and not limited to filtering, converting the visual resolution format and the display resolution format, controlling the timing used to display the media information, or switching scanning techniques used to display the media information.

The media processing node 3 may also include a display 6, which receives the output of the media processing sub-system 5. Display 6 may display the media information at a given format resolution. Examples of format resolution for the display include video graphics array (VGA) format resolution (640×480), extended graphics array (XGA) format resolution (1024×768), super XGA (SXGA) format resolution (1280×1024), ultra XGA (UXGA) format resolution (1600×1200), and so forth. The types of format resolutions vary depending on the application, and they are not limited to the above.

Typically, the media processing sub-system 5 displays the media information using display 6. Media processing sub-system 5 may form an image or picture on display 6 by sweeping an electrical signal horizontally across display 6 one line at a time. The instantaneous brightness at a particular physical point on the display is represented by the amplitude of the electrical signal. The scanning circuit retraces to the left edge of the display and then starts scanning the next line. Starting at the top of the display, all of the lines on the display 6 are scanned in this way. One complete set of lines makes a picture or image. This is referred to as a frame. Once the first complete picture is scanned, the scanning circuit retraces to the top of the display 6 and starts scanning the next frame. In the case of video signals, this process is repeated so fast that the displayed images are perceived to have a continuous motion.

The media processing sub-system may display the media information in several display or scan modes. Examples of scan modes include interlaced and non-interlaced (progressive) modes. These two modes are related to two different scanning techniques. Television signals and compatible displays are typically interlaced and computer signals and compatible displays are typically non-interlaced. The two scan modes are typically incompatible with each other, so media information in one format would need to be converted to the other format before any common processing is performed.

Figure 2:
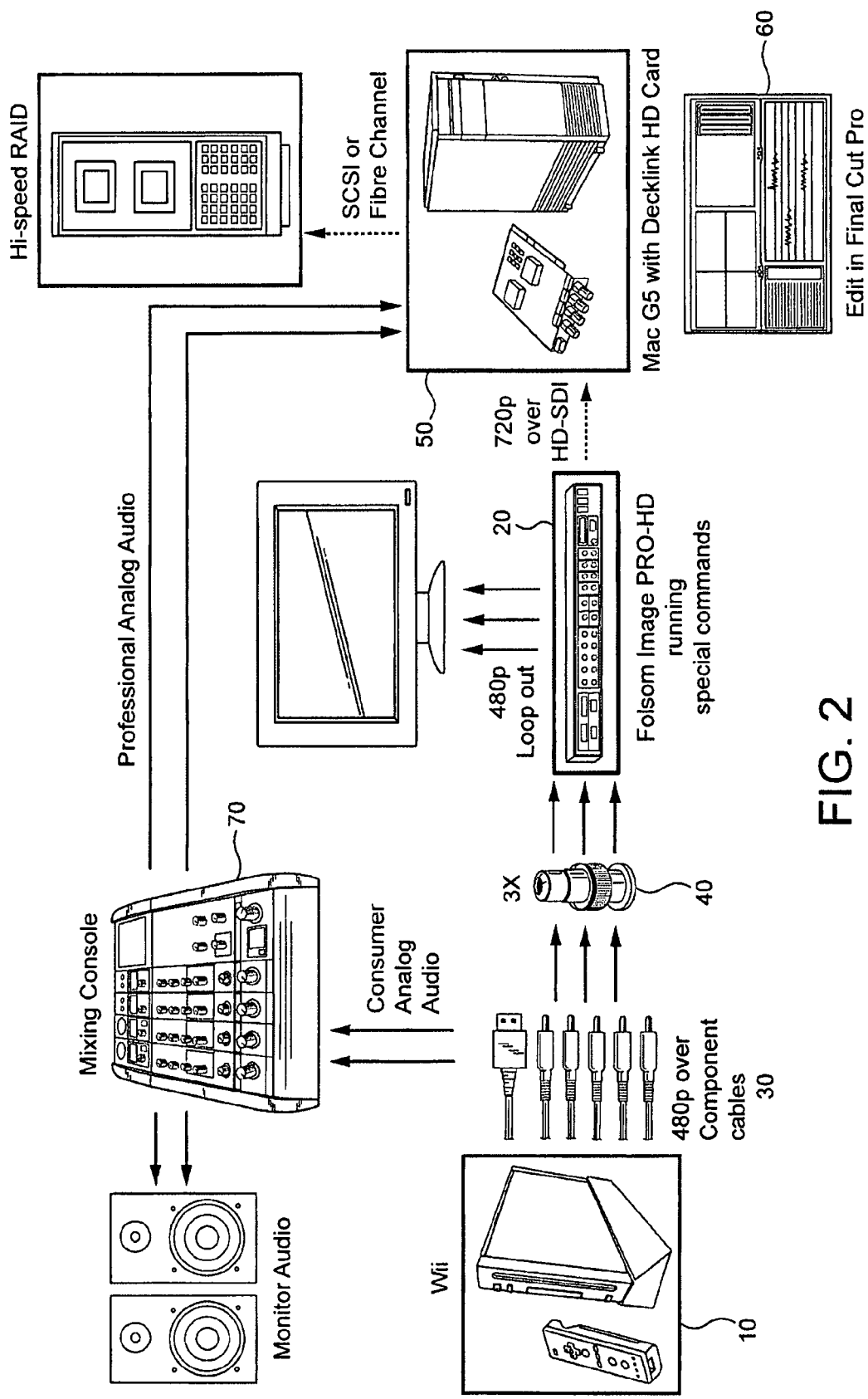
FIG. 2 is a block diagram of an exemplary illustrative non-limiting implementation.

An exemplary illustrative non-limiting digital capturing system is shown in FIG. 2. A video generation system 10, such as but not limited to the Wii video game console manufactured and sold by Nintendo, is set to play in its extended definition television (EDTV) mode, outputting a 480p60 (SMPTE 293M) video signal. The system 10 is connected to a professional grade video scaler device 20 via component video cables 30 and RCA to BNC adapters 40. In an exemplary illustrative non-limiting implementation, video scaler 20 is a Folsom ImagePRO-HD device, that automatically detects the input video signal as an 720×486p signal.

The Folsom ImagePRO-HD device is connected to a serial port of PC 50 by an RS-232 cable. External commands can be inputted directly to the Folsom ImagePRO-HD using any terminal application, for example, HyperTerminal. The commands instruct the scaler device 20 to transform the input video signal to any desired format.

In an exemplary illustrative non-limiting implementation, the following set of commands are sent to the Folsom ImagePRO-HD scaler in order to produce a video signal with the desired properties in the higher definition space. It is noted that in the Folsom ImagePRO-HD's text-based interface, commands are prefaced by a # symbol. The # symbol is included here for clarity:

glmode 4 1 (block 102 in FIG. 4)
This command instructs the scaler device to frame-lock itself to an external generator lock (GENLOCK) system. A block burst generator may be used to maintain synchronization between the various system components, such as the computer and the video scaler. However, it should be noted that this step is not mandatory in the capture process.

iar 3 2 (block 104 in FIG. 4)
The first portion of this command instructs the scaler device 20 to read the input video signal off component video input port #3, which is the input through which the Wii is connected to the Folsom ImagePRO-HD. The second portion of the command instructs the Folsom to treat the video signal as a 4:3 signal. It is noted that the even though the Wii is capable of outputting a signal with a 16:9 aspect ratio or with a 4:3 aspect ratio, the video image output has the same 720×486 pixel resolution whether or not the video is in 4:3 or 16:9 mode. Because the aspect ratio of the Wii's output does not affect the electrical output of the component video plugs, it is preferable to make the capture process independent of the aspect ratio. Therefore, setting the Folsom ImagePRO-HD to treat the video as a 4:3 signal maintains the independence from the aspect ratio, and it yields all Wii captures equal regardless of the game aspect ratio.

reso 75 (block 106 in FIG. 4)
This command causes the output of the Folsom ImagePRO-HD to have the 1280×720 @ 59.94p format.

Figure 4:
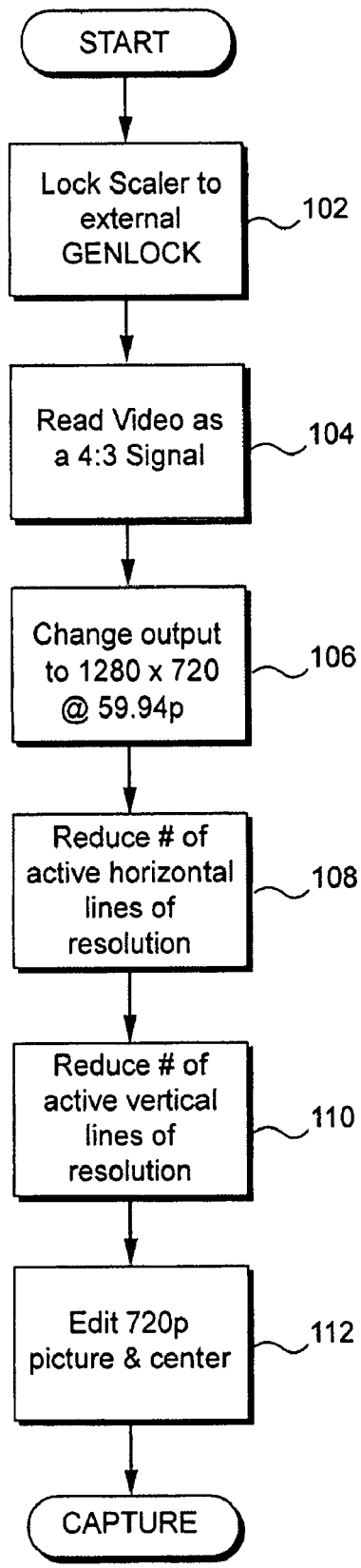
FIG. 4 is an exemplary illustrative non-limiting flowchart of the video capture process.

This format is standard for American 720p video signals and it is ideal for capture, as it maintains both the progressive scanning aspect of the video and the 60 frames per second rate. The 59.94 frame rate is a accurate depiction of American video standards, since US video actually runs at 59.94 frames per second rather than at even 60.

ohatv 960 (block 108 in FIG. 4)

This command instructs the scaler device 20 to change the number of lines of horizontal resolution that are active inside the higher definition 1280×720 720p space. This accomplishes the crucial step of forcing the Folsom ImagePRO-HD to squeeze the output picture into a space that corresponds to the same number of pixels as the original 480p60 input image. It is this reduction in the number of active lines along the horizontal image that prevents any scaling artifacts that would normally be produced by the scaling process. It has been found that the reduction to only 960 active horizontal pixels produces the best image, since it accommodates for the adjustment from the 0.9 (CCIR 601) NTSC pixels to the 1.0 square HDTV pixels.

ovatv 486 (block 110 in FIG. 4)

This command instructs the scaler device 20 to change the number of lines of vertical resolution that are active inside the higher definition 1280×720 720p space. In this way, the transformed image is shrank in the 720p space, and it is made a pixel-to-pixel translation replica of the 480p image. The choice of 486 active lines of resolution corresponds to the exactly same number of lines in the original 480p60 (SMPTE 293M) image. The change in pixel aspect ratio does not affect this number.

ohpos 420 (block 112 in FIG. 4)

The software program Final Cut Pro is used to edit the Wii video footage. When a piece of 720p video is placed into a 480p project, Final Cut Pro automatically centers the video, so that only the very center of the footage appears in the 480p video window. Because of this, it is beneficial to geometrically center the image to the center of the frame. This command positions the image to the horizontal center of the 720p frame.

ovatv 143 (block 114 in FIG. 4)

This command positions the image to the vertical center of the 720p frame.

After the last command, the Folsom ImagePRO-HD outputs a video signal in the proper size, shape and location.

Once the above commands have all been sent to the Folsom ImagePRO-HD scaler, its video output is ready to be captured. The Folsom produces a high definition-serial digital interface (HD-SDI) digital signal that can be captured by any computer having an HDTV video capture card. One example is a PowerMac G5 Quadcore having a Blackmagic DeckLink HD Extreme capture card. FIG. 2 shows such a computer 50 receiving the output of the scaler 20.

For screenshot capture of the video stream, software, for example, Boinx' iStopMotion, allows for capture of a still from the output video stream. iStopMotion can lift a single still out of a video stream with the press of the spacebar, but since Wii games often require both hands and coordinated movements, an X-keys Foot Pedal with iKey software may be used in conjunction with a macro program to activate the space bar. In this way, one can capture playing the video generator 10 with both hands and use the foot on the pedal to take a screenshot.

Since screenshots are placed in the center of a 1280×720 HDTV frame, the captured screens are exported into a picture editing program, for example, Adobe Photoshop CS, to cut the surrounding black sections and reshape the image as needed. For a video game running in 4:3 mode, the number of vertical pixels is reduced by 10%. For a game running in 16:9 mode, the number of vertical pixels is increased by 20%. In this way, the proper aspect ratio of the final picture is created, while maintaining the maximum quality of the Wii output.

The 720p HD-SDI video signal output of the Folsom ImagePRO-HD 20 is received and recorded by computer 50 without compression, using the Final Cut Pro video editor 60 in conjunction with the Blackmagic DeckLink HD Extreme card, and Apple's Uncompressed 4:2:2 codec. However, since uncompressed HDTV video has extremely large bandwidth, a high speed hard disk is required. For example, an Apple xSAN or another RAID solution, like the ones offered by Ciprico, combined with a quality SCSI card may be used.

Regarding the audio portion of the Wii output signal, its consumer voltage level of −10 dBv is increased to the level +4 dBv of the Blackmagic DeckLink HD Extreme, by using a quality audio mixer 70. More specifically, the analog audio output of the Wii is fed into the audio mixer 70, whose output is then inputted into the analog audio input of the DeckLink card. This audio signal is then combined in 50 with the HD-SDI video signal output of the Folsom ImagePRO-HD to create the final Wii video stream, recorded with the Final Cut Pro using Apple's uncompressed 4:2:2 codec.

The video file resulting from the conversion due to the Folsom ImagePRO-HD scaler is a 720p file with the original 480p image placed in the center of the 720p frame, unaffected by the scaling process. The last step in the transformation process comprises cutting the 480p image from the 720p frame. This is accomplished by using a macro program built into the Apple's Compressor 2 application. The macro simply chops 280 pixels off the left and right sides of the picture and 117 pixels off the top and bottom sides. The resulting picture is an NTSC replica of the original video, 720×486 pixels large, and running at 60 frames per second, progressive scan.

The digitized, Quicktime format videos can then be additionally edited by using Final Cut Pro and placed in any desired format. However, the above method ensures that the master copy is taken from the highest possible quality video produced by the Wii.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein. For example, while specific video resolutions and frame rates have been quoted above, other resolutions and/or frame rates could be used instead.

The invention claimed is:

1. A method for efficiently digitally capturing an analog video signal being outputted by a video generation system, comprising:
    a) inputting said analog video signal having a first video resolution format, a first frame rate and a first scanning mode into a video scaler device;
    b) inputting a set of commands to said video scaler device so that the scaler device transforms said analog video signal to produce an output digital video signal having a second video resolution format, a second frame rate and a second scanning mode;
    c) mixing said output digital video signal with the audio portion of said analog video signal at a computer having a video capture card, resulting in a digital video stream; and
    d) further processing said video stream so that it comprises a desired format, wherein said set of commands further includes a command to reduce the number of active lines in the output digital video signal from a standard number of active lines for the output digital video signal to a non-standard number of active lines for the output digital video signal.

2. The method of claim 1, wherein said first resolution format is a 720×486 format and said second resolution format is a 1280×720 format.

3. The method of claim 2, wherein said first frame rate and said second frame rate are 60 frames per second and wherein said first scanning mode and said second scanning mode are a progressive scanning mode.

4. The method of claim 3, wherein said set of commands includes a command to instruct the video scaler device to treat the input analog video signal as a signal having a 4:3 aspect ratio.

5. The method of claim 4, wherein said set of commands further includes a command to convert the input analog video signal from a 720×486 resolution format to a 1280×720 resolution format.

6. The method of claim 5, wherein said set of commands further includes a command to reduce the number of lines of horizontal resolution that are active inside the 720p space from a standard number of lines for the 720p space to a non-standard number of lines for the 720p space.

7. The method of claim 6, wherein the number of active lines of horizontal resolution inside the 720p space is 960.

8. The method of claim 5, wherein said set of commands further includes a command to reduce the number of lines of vertical resolution that are active inside the 720p space from a standard number of lines for the 720p space to a non-standard number of lines for the 720p space.

9. The method of claim 8, wherein the number of active lines of vertical resolution inside the 720p space is 486.

10. The method of claim 5, wherein said set of commands further includes a command to position the final image at the horizontal center of the 720p space.

11. The method of claim 5, wherein said set of commands further includes a command to position the final image at the vertical center of the 720p space.

12. The method of claim 2, wherein said further processing includes deleting pixels off all four sides in the 720p frame, so that the resulting picture is a replica of the input 480p video.

13. The method of claim 1, wherein said output digital video signal is a high definition-serial digital interface (HD-SDI) signal.

14. The method of claim 1, wherein said video generation system is a computer video game console, including a game console.

15. An apparatus for efficiently digitally capturing an analog video signal, comprising:
a video generation system outputting an analog video signal having a first video resolution format, a first frame rate and a first scanning mode;
a video scaler device that receives said analog video signal;
a terminal that transmits a set of software commands into said video scaler device so that the video scaler device transforms said input video signal into an output digital video signal having a second video resolution format, a second frame rate and a second scanning mode;
an audio mixer device that receives the audio portion of said analog video signal and produces an analog audio output signal having increased voltage level;
a computer having a video capture card that combines said output digital video signal having said second video resolution format, said second frame rate and said second scanning mode with said analog audio output signal to produce a digital video stream; and
a software video processing platform that processes said digital video stream so that it comprises a desired format,
wherein said set of software commands further includes a command to reduce the number of active lines in the output digital video signal from a standard number of active lines for the output digital video signal to a non-standard number of active lines for the output digital video signal.

16. The apparatus of claim 15, wherein said first resolution format is a 720×486 format and said second resolution format is a 1280×720 format.

17. The apparatus of claim 16, wherein said first frame rate and said second frame rate are 60 frames per second and wherein said first scanning mode and said second scanning mode are a progressive scanning mode.

18. The apparatus of claim 17, wherein said set of commands includes a command to instruct the video scaler device to treat the input analog video signal as a signal having a 4:3 aspect ratio.

19. The apparatus of claim 18, wherein said set of commands further includes a command to convert the input analog video signal from a 720×486 resolution format to a 1280×720 resolution format.

20. The apparatus of claim 19, wherein said set of commands further includes a command to reduce the number of lines of horizontal resolution that are active inside the 720p space to 960 lines and the number of lines of vertical resolution that are active inside the 720p space to 486.

21. The apparatus of claim 19, wherein said set of commands further includes a command to position the final image at the horizontal center and the vertical center of the 720p space.

22. The apparatus of claim 16, wherein said processing includes deleting pixels off all four sides in the 720p frame, so that the resulting picture is a replica of the input 480p video.

23. The apparatus of claim 15, wherein said output digital video signal is a high definition-serial digital interface (HD-SDI) signal.

24. The apparatus of claim 15, wherein said video generation system is a computer video game console, including a game console.

25. A video capture method comprising:
(a) sampling a 480p60 video signal at a predetermined frame rate;
(b) changing the number of lines of horizontal resolution active within a 1280×720 space to squeeze the output picture down into a space that reflects substantially the same number of pixels as the original 480p60 image;
(c) choosing a number of lines of vertical resolution to shrink the image into the active space; and
(d) capturing the resulting video stream,
wherein the number of lines in the active space are reduced from a standard number of lines in the active space to a non-standard number of lines in the active space, thereby preventing scaling artifacts in the resulting video stream.

* * * * *